(12) United States Patent
Todo et al.

(10) Patent No.: US 11,305,367 B2
(45) Date of Patent: Apr. 19, 2022

(54) NON-CONSUMABLE ELECTRODE ARC-WELDING METHOD

(71) Applicant: DAIHEN Corporation, Osaka (JP)

(72) Inventors: Michitaka Todo, Osaka (JP); Masatoshi Ooie, Osaka (JP); Toshiyuki Tanaka, Osaka (JP); Ichiro Umezawa, Osaka (JP)

(73) Assignee: DAIHEN Corporation, Osaka (JP)

( * ) Notice: Subject to any disclaimer, the term of this patent is extended or adjusted under 35 U.S.C. 154(b) by 430 days.

(21) Appl. No.: 16/164,908

(22) Filed: Oct. 19, 2018

(65) Prior Publication Data

US 2019/0126378 A1 May 2, 2019

(30) Foreign Application Priority Data

Nov. 1, 2017 (JP) .............................. JP2017-211925

(51) Int. Cl.
*B23K 9/09* (2006.01)
*B23K 9/167* (2006.01)
(Continued)

(52) U.S. Cl.
CPC ................ *B23K 9/091* (2013.01); *B23K 9/09* (2013.01); *B23K 9/1043* (2013.01); *B23K 9/164* (2013.01); *B23K 9/167* (2013.01); *B23K 31/003* (2013.01)

(58) Field of Classification Search
CPC ........ B23K 31/003; B23K 9/09; B23K 9/091; B23K 9/1043; B23K 9/164; B23K 9/167;
(Continued)

(56) References Cited

U.S. PATENT DOCUMENTS 4,396,823 A * 8/1983 Nihei ................... B23K 9/1068
219/130.51

FOREIGN PATENT DOCUMENTS

JP 50-159444 12/1975
JP 56-86680 A 7/1981
(Continued)

OTHER PUBLICATIONS

English language translation of cited JP2004009115 (Year: 2004).*
(Continued)

*Primary Examiner* — Dana Ross
*Assistant Examiner* — Joseph W Iskra
(74) *Attorney, Agent, or Firm* — Hamre, Schumann, Mueller & Larson, P.C.

(57) ABSTRACT

A non-consumable electrode arc-welding method is provided for causing a welding machine to output or stop a welding current in accordance with at least an ON state and an OFF state of a start signal. In the method, a start signal is switched between an ON state and an OFF state, thereby controlling the on/off operation of the welding machine. Further, an operation mode instruction signal is switched between a normal mode and an interval mode, thereby controlling the operation mode of the welding machine. When the operation mode instruction signal indicates the interval mode and also the start signal is in the ON state, the welding current is outputted in a welding current output period. Then, the output of the welding current is suspended in a welding current interval period successively following the welding current output period.

7 Claims, 7 Drawing Sheets

(51) Int. Cl.
*B23K 9/16* (2006.01)
*B23K 31/00* (2006.01)
*B23K 9/10* (2006.01)

(58) Field of Classification Search
CPC . C03C 2203/52; C03C 23/0055; C03C 3/087; C03C 3/091; C03C 3/097
USPC .................................................. 219/130.5
See application file for complete search history.

(56) References Cited

FOREIGN PATENT DOCUMENTS

| | | |
|---|---|---|
| JP | 3-94983 A | 4/1991 |
| JP | 8-243744 A | 9/1996 |
| JP | 2004-9115 A | 1/2004 |

OTHER PUBLICATIONS

Search Report issued in the corresponding European Patent Application, dated Apr. 2, 2019 (6 pages).
Office Action received in the corresponding Japanese Patent application, dated Jul. 27, 2021, and corresponding machine translation (6 pages).

* cited by examiner

NON-CONSUMABLE ELECTRODE ARC-WELDING METHOD

FIELD

The present disclosure relates to a non-consumable electrode arc-welding method according to which a welding machine outputs or stops a welding current, in accordance with the state of a start signal.

BACKGROUND

A non-consumable electrode arc-welding method is an arc-welding method that involves melting a base material without consuming the electrode, by using a metal with a high melting point such as tungsten as the electrode, and using an inert gas such as argon or helium as a shielding gas. Non-consumable electrode arc-welding methods include TIG welding, as disclosed in JP-A-2004-9115, and plasma welding, and are mainly used for welding sites where quality is required.

In welding sites where quality is required, heat input into the base material needs to be minimized, in order to avoid defects such as increased distortion and excessive penetration.

JP-A-2004-9115 proposes, in pulse TIG welding that involves periodically outputting a peak current which is a relatively high current value and a relatively low base current, a pulse TIG welding method for outputting a high-frequency pulse current which is a relatively low average current value instead of the base current.

According to JP-A-2004-9115, cases arise where the base current is set at or below 20 A in pulse TIG welding that is performed with an average current at or below 70 A, and it is shown that the arc becomes unstable while the base current is being output. In JP-A-2004-9115, it is shown that a stable arc is achieved by outputting a high-frequency pulse current instead of the base current.

Even using the method disclosed in JP-A-2004-9115, there remains a limit to how much the input heat into the base material can be lowered in outputting the base current.

SUMMARY

In view thereof, the present disclosure is presented to provide a non-consumable electrode arc-welding method for minimizing input heat into a base material with a simple method.

A first aspect of the disclosure provides a non-consumable electrode arc-welding method for causing a welding machine to output or stop a welding current in accordance with at least an ON state and an OFF state of a start signal. Specifically, the method may include: switching between an ON state and an OFF state of a start signal that controls an on/off operation of the welding machine; and switching between a normal mode and an interval mode of an operation mode instruction signal controlling an operation mode of the welding machine. When the operation mode instruction signal indicates the interval mode and the start signal is in the ON state, the welding current is being outputted in a predetermined welding current output period, and the output of the welding current is being suspended in a welding current interval period successively following the welding current output period.

In the above method, the output and the suspension of the welding current may be repeated while the start signal is in the ON state.

In the above method, the welding current output period and the welding current interval period may have predetermined lengths of time, respectively.

The above method may further include: counting a number of times that the output and the suspension of the welding current are repeated; and stopping the output of the welding current when the counted number reaches a predetermined welding current output count.

The above method may further include stopping the output of the welding current when a predetermined operation period elapses after the start signal is input.

The above method may further include outputting a trigger signal that causes the start signal to switch between the ON state and the OFF state in a manner such that the start signal switches from the OFF state to the ON state upon input of a first trigger signal, while also switching from the ON state to the OFF state upon input of a second trigger signal.

According to the teachings of the present disclosure, input heat into a base material can be minimized with a simple method.

DESCRIPTION OF EMBODIMENTS

Hereinafter, embodiments in accordance with the present disclosure will be described with reference to the drawings.

First Embodiment

The first embodiment relates to a non-consumable electrode arc-welding method whereby a welding machine is configured to repeatedly perform welding current output and welding current suspension, upon a start signal being inputted when an operation mode instruction signal indicates an interval mode. In an illustrated example, as explained in detail below, a welding current is being outputted in a welding current output period, while the output of the welding current is being suspended in a welding current interval period successively following the welding current output period.

Figure 1:
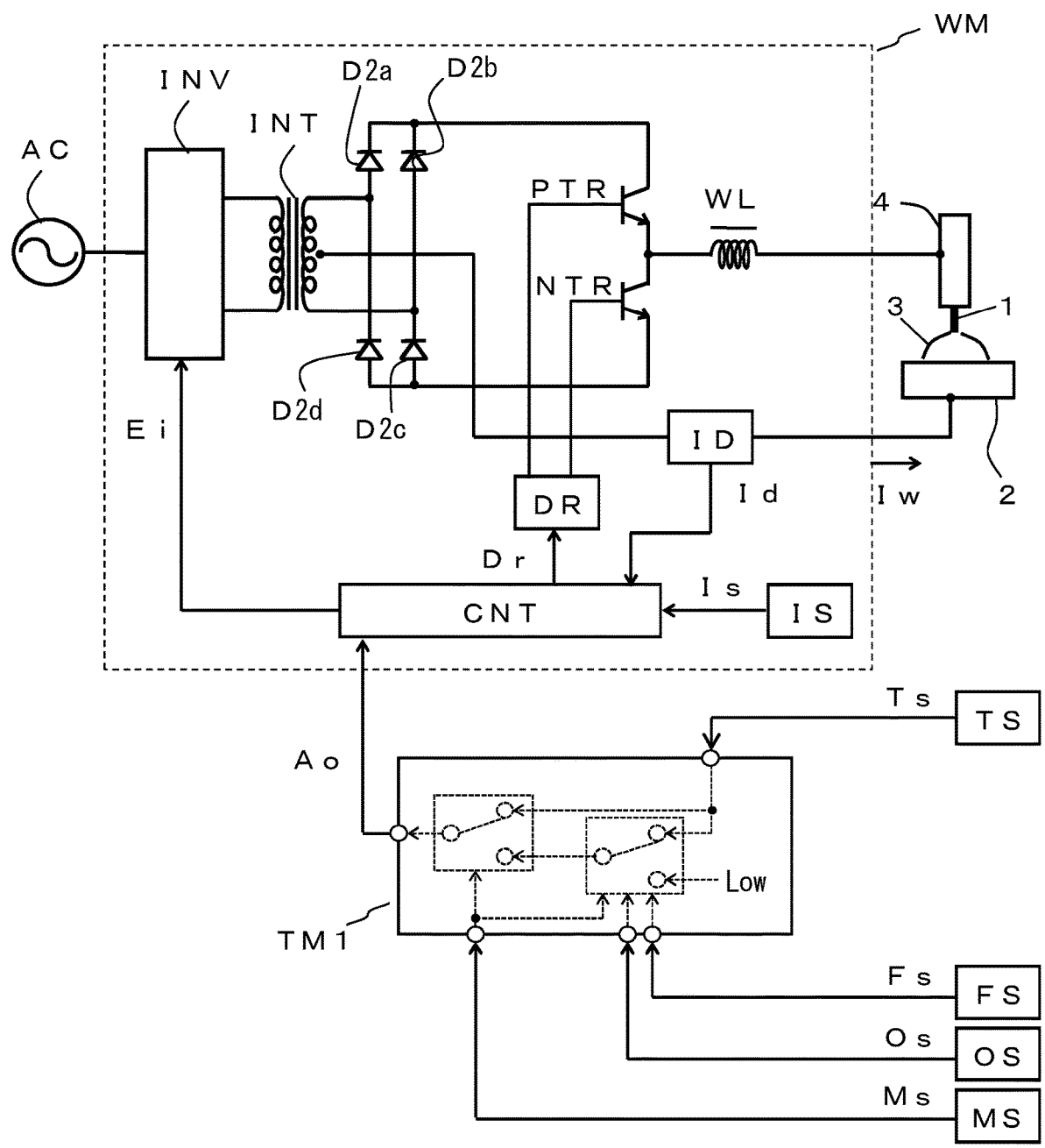
FIG. 1 is a block diagram of a welding machine for implementing a non-consumable electrode arc-welding method according to a first embodiment.

FIG. 1 is a block diagram of a welding machine for implementing the non-consumable electrode arc-welding method according to the first embodiment.

As shown in the figure, a welding machine WM has an inverter circuit INV, a transformer INT, rectifier diodes D2a to D2d, polarity switching circuits PTR and NTR, a drive circuit DR, a direct current (DC) reactor WL, a welding condition setting circuit IS, a current detection circuit ID and a control circuit CNT, and outputs a welding current Iw between an electrode 1 (partially held in a welding torch 4) and a base material 2. The welding machine WM is modeled on the basic circuit configuration of an alternating current (AC) TIG welding machine, but the circuit configuration can be modified to conform to the non-consumable electrode arc-welding method to which the welding machine is applied. For example, if the welding machine WM is a DC TIG welding machine, the polarity switching circuits PTR and NTR are omitted.

The welding condition setting circuit IS outputs a welding condition setting signal Is. The welding condition setting signal Is includes or carries information required in defining operations of the welding machine WM such as a setting current Iset, a welding mode setting signal, a pulse frequency, a pulse peak current, a pulse base current and a polarity switching frequency.

The current detection circuit ID detects the welding current Iw and outputs a current detection signal Id. The control circuit CNT outputs a drive signal Dr and a current error amplification signal Ei, with the welding condition setting signal Is, the current detection signal Id and a welding output signal Ao described later as inputs. The control circuit CNT, upon the welding output signal Ao described later being input, controls the drive signal Dr and the current error amplification signal Ei on the basis of the current detection signal Id, such that the welding current Iw attains a predetermined value that is determined by the welding condition setting signal Is. The control circuit CNT, upon the welding output signal Ao described later changing to a non-input, controls the current error amplification signal Ei so as to stop output of the welding current Iw, in accordance with the welding condition setting signal Is.

The inverter circuit INV, with a commercial power AC such as 3-phase 200 V power and the current error amplification signal Ei as inputs, converts the commercial power AC into a high frequency alternating current in accordance with the current error amplification signal Ei, and outputs the high frequency alternating current to the transformer INT. The high frequency alternating current is converted into the welding current Iw by the transformer INT and the rectifier diodes D2a to D2d, and output to the polarity switching circuits PTR and NTR.

The drive circuit DR and the polarity switching circuits PTR and NTR excite one of the polarity switching circuits in accordance with the drive signal Dr, with the drive signal Dr as an input. The polarity switching circuits PTR and NTR convert the polarity of the input welding current Iw, and output the resultant current to the DC reactor WL. The welding current Iw is smoothed by the DC reactor WL, and output to the welding torch 4.

Although not shown, the welding torch 4 internally has a mechanism for supplying the welding current Iw to the electrode 1, a mechanism for retaining the electrode 1, and a mechanism for supplying a shielding gas between the electrode 1 and the base material 2. When the welding current Iw is conducted in a state where the shielding gas is supplied, an arc 3 occurs between the electrode 1 and the base material 2.

As described above, the welding machine WM can be regarded as a circuit that outputs the welding current Iw to the welding torch 4, with the welding output signal Ao described later as an input. Hereinafter, the welding machine WM is given as a circuit that exhibits the behavior of outputting the welding current Iw when the welding output signal Ao described later is input, and not outputting the welding current Iw when the welding output signal Ao described later is not input.

A start signal setting circuit TS outputs a start signal Ts determined in advance. The start signal Ts indicates at least a state of being output and a state of not being output.

An operation mode setting circuit MS outputs an operation mode instruction signal Ms determined in advance. The operation mode instruction signal Ms is a signal for instructing at least the two states of a normal mode and an interval mode.

A welding current output period setting circuit OS outputs a welding current output period signal Os determined in advance. A welding current interval period setting circuit FS outputs a welding current interval period signal Fs determined in advance. The welding current output period signal Os and the welding current interval period signal Fs indicate a time period from 0.05 s to 9.99 s inclusive, for example.

A first welding output setting circuit TM1 outputs the welding output signal Ao, with the start signal Ts, the operation mode instruction signal Ms, the welding current output period signal Os and the welding current interval period signal Fs as inputs. The welding output signal Ao has at least the two states of being output and not being output. When the welding output signal Ao is viewed from the receiving side, the state of being output is an input state and the state of not being output is a not-input state. The input state is illustrated as being High level and the not-input state is illustrated as being Low level. The first welding output setting circuit TM1 is constituted by at least two switching circuits such as electromagnetic relays or switching elements, and switches the respective switching circuits on the basis of the input signals and generates the welding output signal Ao.

When the operation mode instruction signal Ms indicates the normal mode, the first welding output setting circuit TM1 outputs the state of the start signal Ts directly (or in an corresponding manner) as the welding output signal Ao. Specifically, in the illustrated example, the welding output signal Ao will be High level when the start signal Ts is High level, while the welding output signal Ao will be Low level when the start signal Ts is Low level. On the other hand, when the operation mode instruction signal Ms indicates the interval mode, the first welding output setting circuit TM1 performs operations as follows:

(1) When the start signal Ts is not being inputted (which corresponds to the start signal Ts being Low level), the circuit TM1 outputs the state of the start signal Ts directly as the welding output signal Ao. Thus, the welding output signal Ao is Low level.

(2) When the start signal Ts is being inputted (i.e., High level), the circuit TM1 outputs the state of the start signal Ts directly as the welding output signal Ao (High level) during the period indicated by the welding current output period signal Os. Thus, during this period, both the start signal Ts and the welding output signal Ao are High levels.

(3) When the above period indicated by the welding current output period signal Os elapses, the circuit TM1 sets the welding output signal Ao to Low level, and keeps the signal Ao low during the period indicated by the welding current interval period signal Fs. Thus, during this period, the start signal Ts is High level, but the welding output signal Ao is Low level.

(4) When the period indicated by the welding current interval period signal Fs elapses, the circuit TM1 returns to (2) (and may further to (3)), thereby outputting high-level welding output signal Ao.

(5) Upon the start signal Ts changing from input (High level) to not input (Low level), the circuit TM1 ends the repetition of (2) to (4) and will output the start signal Ts directly as the welding output signal Ao. Thus, at this stage, the welding output signal Ao is Low level.

Figure 2:
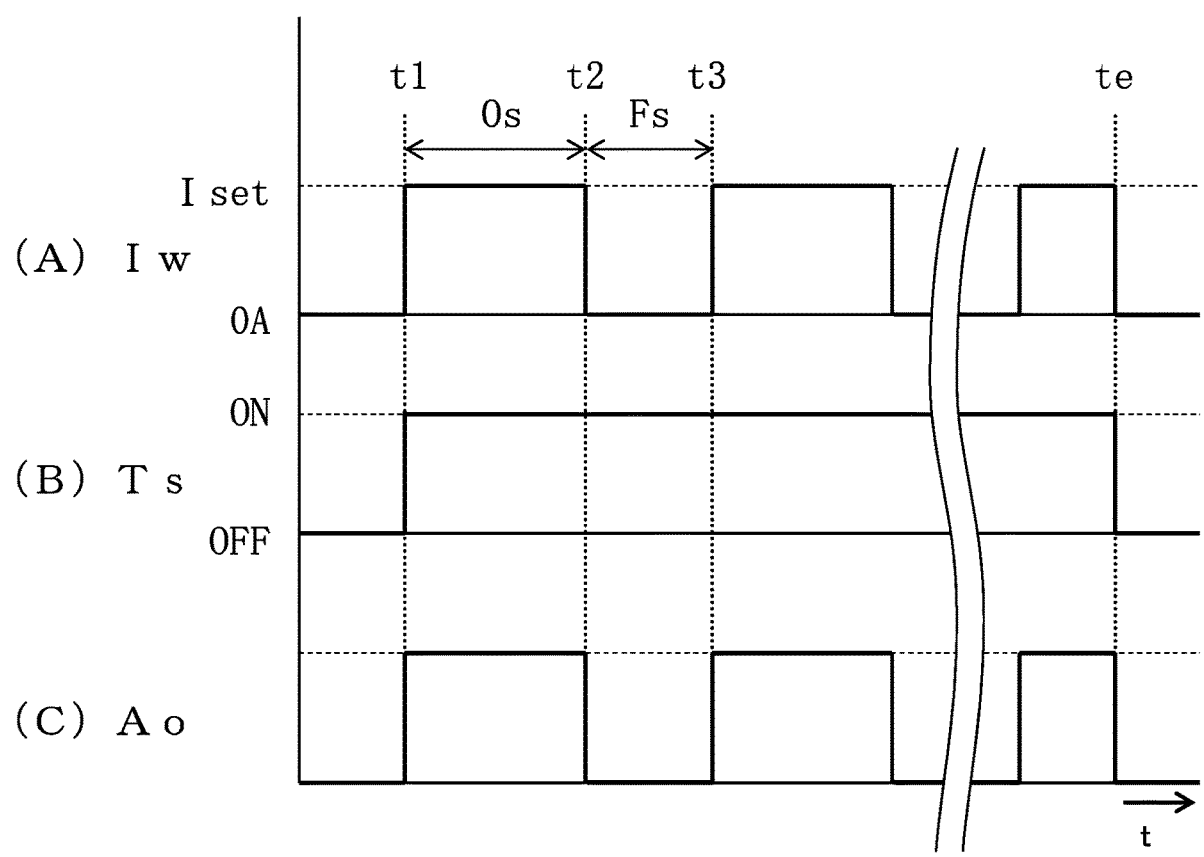
FIG. 2 is a timing chart of the case where an operation mode instruction signal of the non-consumable electrode arc-welding method in the first embodiment indicates an interval mode.

FIG. 2 is a timing chart of the non-consumable electrode arc-welding method in the first embodiment. (A) of FIG. 2 shows the change in the welding current Iw over time, (B) of FIG. 2 shows the change in the start signal Ts over time, and (C) of FIG. 2 shows the change in the welding output signal Ao over time. The horizontal axes each show time. Hereinafter, operations of the first embodiment will be described using FIG. 2.

In (B) of FIG. 2, the start signal Ts indicates two different states. In the illustrated example, one of the two states is OFF state (Low level) which may indicate the signal Ts not being outputted, and the other of the states is ON state (High level) which may indicate the signal Ts being outputted. When viewed from the side that receives the signal, OFF indicates not inputted (no signal input or substantially zero signal input) and ON indicates inputted (non-zero signal input).

Before time t1, the start signal Ts is OFF, that is, not input, and thus the start signal Ts is output directly as the welding output signal Ao. That is, the welding output signal Ao is Low level, and the welding machine WM does not output the welding current Iw.

At time t1, the start signal Ts is ON, that is, input. The start signal Ts is outputted directly as the welding output signal Ao. That is, since the welding output signal Ao is High level, the welding machine WM outputs the welding current Iw. In the welding current Iw in (A) of FIG. 2, an AC waveform whose average voltage serves as the setting current Iset is actually outputted, but for simplicity the setting current Iset is denoted as being output.

In the period from time t1 until time t2 at which the welding current output period Os elapses, the welding output signal Ao is High level, and thus the welding machine WM outputs the welding current Iw.

At time t2, the welding output signal Ao changes to Low. The welding machine WM suspends output of the welding current Iw.

In the period from time t2 until time t3 at which the welding current interval period Fs elapses, the welding output signal Ao remains Low. Accordingly, the welding machine WM continues to suspend output of the welding current Iw.

At time t3, the welding output signal Ao changes to High, and the start signal Ts is outputted directly as the welding output signal Ao. That is, since the welding output signal Ao is High level, the welding machine WM outputs the welding current Iw.

After time t3, the processing shown from time t1 to time t3 is repeated until the start signal Ts changes to OFF. At time te at which the start signal Ts changes to OFF, repetition of the processing is then ended, and the welding output signal Ao is set to Low. The welding machine WM stops output of the welding current Iw.

Next, the operation and effect of the non-consumable electrode arc-welding method according to the abovementioned first embodiment will be described. In the case of welding at an average current 20 A of the current at which an arc is generally difficult to maintain, the average current is lowered by providing an interval period while outputting sufficient current to maintain the arc, when the setting current Iset is set to 80 A, the welding current output period Os is set to 0.1 s, and the welding current interval period signal Fs is set to 0.3 s, for example, thus enabling welding at the average current 20 A. In this way, a low welding current can be easily obtained by appropriately configuring the setting current, the output period and the interval period, without concern for the processing by the welding machine WM.

Accordingly, the non-consumable electrode arc-welding method according to the first embodiment does not require the use of a welding machine having a special function in order to output a low welding current, thus enabling the input heat into the base material to be minimized with a simple method.

The non-consumable electrode arc-welding method according to the first embodiment is used for welding of sites where quality is required, and is thus desirably used in manual welding in which the operator makes adjustments during the welding while visually checking the molten state of the base material. Also, the non-consumable electrode arc-welding method according to the first embodiment is desirably used in TIG welding that produces an arc with a low energy density and is suited to manual welding, among non-consumable electrode arc-welding methods.

Second Embodiment

The second embodiment relates to a non-consumable electrode arc-welding method whereby the number of times that the welding current output period and the welding current interval period are repeated is counted, and the output of the welding current is stopped when the counted number of repetitions reaches a predetermined count, i.e., "welding current output count".

Figure 3:
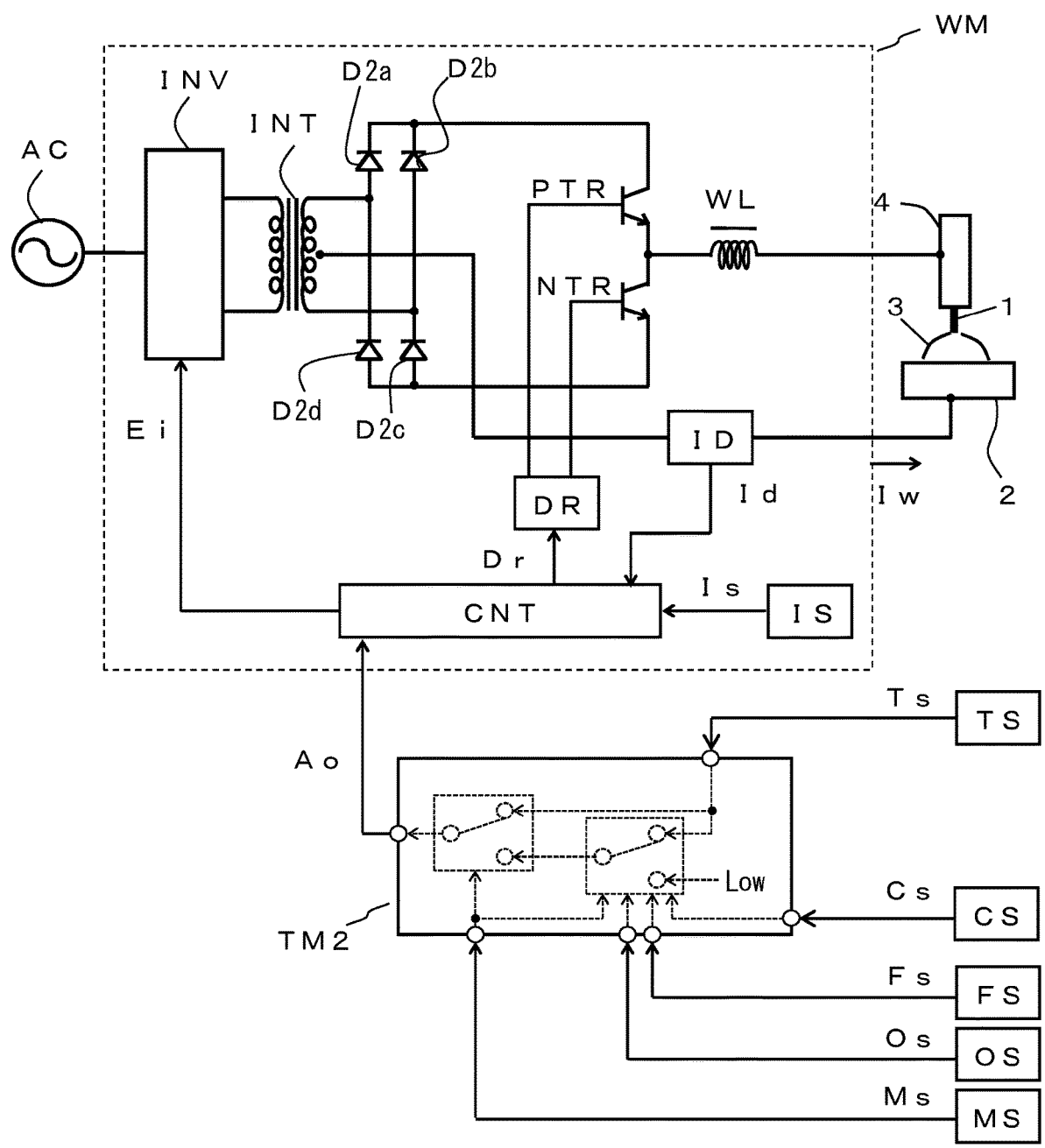
FIG. 3 is a block diagram of a welding machine for implementing a non-consumable electrode arc-welding method according to a second embodiment.

FIG. 3 is a block diagram of a welding machine that implements the non-consumable electrode arc-welding method according to the second embodiment. In FIG. 3, the same reference signs are given to blocks that are the same as FIG. 1, and description thereof is omitted. In FIG. 3, a repeat count setting circuit CS is added, and the first welding output setting circuit TM1 is replaced with a second welding output setting circuit TM2.

The repeat count setting circuit CS outputs a repeat count setting signal Cs determined in advance. The repeat count setting signal Cs has a range from 1 to 999 times, for example.

The second welding output setting circuit TM2 outputs the welding output signal Ao, with the start signal Ts, the operation mode instruction signal Ms, the welding current output period signal Os, the welding current interval period signal Fs and the repeat count setting signal Cs as inputs.

The second welding output setting circuit TM2 outputs the state of the start signal Ts directly as the welding output signal Ao, when the operation mode instruction signal Ms indicates the normal mode. The second welding output setting circuit TM2 performs operations shown below, when the operation mode instruction signal Ms indicates the interval mode.

(1) Outputs the state of the start signal Ts directly as the welding output signal Ao, when the start signal Ts is not inputted. That is, sets the welding output signal Ao to Low, and sets the repeat count to 0.

(2) Outputs the state of the start signal Ts directly as the welding output signal Ao during the period indicated by the welding current output period signal Os, upon the start signal Ts being inputted. That is, sets the welding output signal Ao to High.

(3) Sets the welding output signal Ao to Low during the period indicated by the welding current interval period signal Fs, when the period indicated by the welding current output period signal Os elapses.

(4) Increments the repeat count and returns to (2), when the period indicated by the welding current interval period signal Fs elapses.

(5) Ends the repetition of (2) to (4) and sets the welding output signal Ao to Low, upon the repeat count of (2) to (4) becoming greater than or equal to the repeat count setting signal Cs.

(6) Ends the repetition of (2) to (4) and changes the repeat count to 0, upon the start signal Ts changing from input to not input. Outputs the state of the start signal Ts directly as the welding output signal Ao at the same time. That is, sets the welding output signal Ao to Low.

Figure 4:
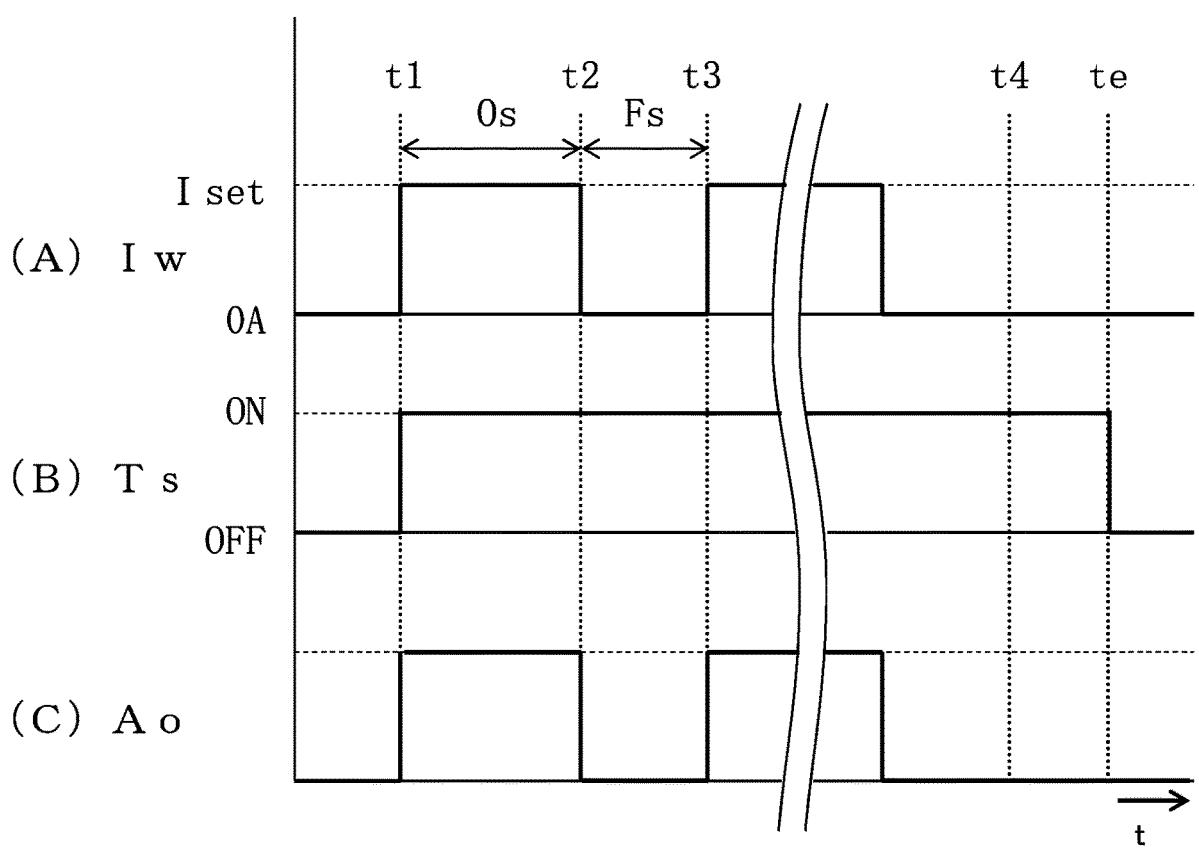
FIG. 4 is a timing chart of the non-consumable electrode arc-welding method in the second embodiment.

FIG. 4 is a timing chart of the non-consumable electrode arc-welding method in the second embodiment. (A) of FIG. 4 shows the change in the welding current Iw over time, (B) of FIG. 4 shows the change in the start signal Ts over time, and (C) of FIG. 4 shows the change in the welding output signal Ao over time. The horizontal axes each show time. Hereinafter, operations of the second embodiment will be described using FIG. 4. In FIG. 4, the same reference signs are given to signals and times that are the same as FIG. 2, and description thereof is omitted.

The processing shown in the period from time t1 to time t3 of FIG. 4 is repeated until the repeat count becomes greater than or equal to the repeat count setting signal Cs in the period from time t1 to time t3. At time t4, the repeat count reaches the repeat count setting signal Cs. Accordingly, the repetition is ended and the welding output signal Ao is set to Low.

Next, the operation and effect of the non-consumable electrode arc-welding method according to the abovementioned second embodiment will be described. In welding sites where quality is required, the welding time period needs to be managed from the viewpoint of managing the input heat into the base material. Particularly with manual welding, the operator is focused on the arc during welding, and thus has no way of knowing the time, and time management tends to be neglected. Thus, management of welding time period is facilitated by designating the repeat count in advance.

Third Embodiment

The third embodiment relates to a non-consumable electrode arc-welding method whereby the output of the welding current is stopped when a predetermined operation period elapses after the start signal is inputted.

Figure 5:
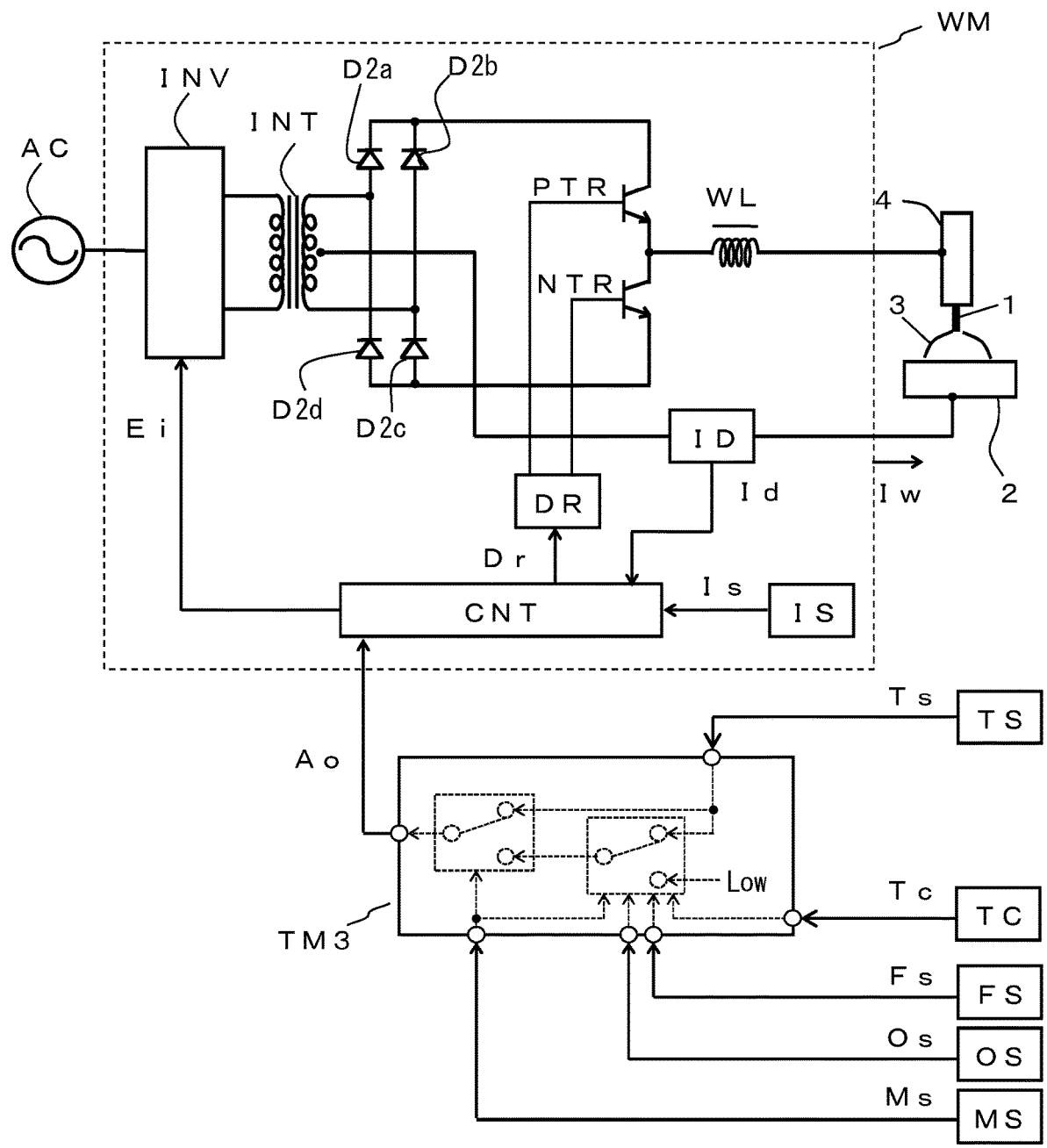
FIG. 5 is a block diagram of a welding machine for implementing a non-consumable electrode arc-welding method according to a third embodiment.

FIG. 5 is a block diagram of a welding machine that implements the non-consumable electrode arc-welding method according to the third embodiment. In FIG. 5, the same reference signs are given to blocks that are the same as FIGS. 1 and 3, and description thereof is omitted. In FIG. 5, the repeat count setting circuit CS of FIG. 3 is replaced with a start time period setting circuit TC, and the second welding output setting circuit TM2 is replaced with a third welding output setting circuit TM3.

The start time period setting circuit TC outputs a start time period setting signal Tc determined in advance. The start time period setting signal Tc is 0.1 seconds or more, for example.

The third welding output setting circuit TM3 outputs the welding output signal Ao, with the start signal Ts, the operation mode instruction signal Ms, the welding current output period signal Os, the welding current interval period signal Fs and the start time period setting signal Tc as inputs.

The third welding output setting circuit TM3 outputs the state of the start signal Ts directly as the welding output signal Ao, when the operation mode instruction signal Ms indicates the normal mode. The third welding output setting circuit TM3 performs operations shown below, when the operation mode instruction signal Ms indicates the interval mode.

(1) Outputs the state of the start signal Ts directly as the welding output signal Ao, when the start signal Ts is not inputted. That is, sets the welding output signal Ao to Low, and sets the start time period to 0.

(2) Starts measurement of the start time period at the same time upon the start signal Ts being inputted.

(3) Sets the welding output signal Ao to High during the period indicated by the welding current output period signal Os, and outputs the state of the start signal Ts directly as the welding output signal Ao. That is, sets the welding output signal Ao to High.

(4) Sets the welding output signal Ao to Low during the period indicated by the welding current interval period signal Fs, when the period indicated by the welding current output period signal Os elapses.

(5) Returns to (3) when the period indicated by the welding current interval period signal Fs elapses.

(6) Ends the repetition of (3) to (5) and sets the welding output signal Ao to Low, upon the start time period becoming greater than or equal to the start time period setting signal Tc. Stops measurement of the welding time period at the same time.

(7) Ends the repetition of (3) to (5), stops measurement of the start time period and sets the start time period to 0, upon the start signal Ts changing from input to not input. Outputs the state of the start signal Ts directly as the welding output signal Ao at the same time. That is, sets the welding output signal Ao to Low.

The third embodiment is a mode in which the start time period is designated directly, rather than using the repeat count shown in the second embodiment. The timing chart of the third embodiment has a start time period from time t1 to time t4 of FIG. 2, and is thus similar to FIG. 2. Depending on the start time period setting signal Tc, however, time t4 may possibly overlap with the welding current output period. Given that the third embodiment designates the start time period, management of the welding time period is facilitated.

Fourth Embodiment

The fourth embodiment relates to a non-consumable electrode arc-welding method whereby a welding machine repeatedly outputs a welding current in the welding current output period and suspends output of the welding current in the welding current interval period, upon the start signal (or trigger signal) changing from a non-input to an input, and stops output of the welding current, upon the start signal (trigger signal) again changing from a non-input to an input.

Figure 6:
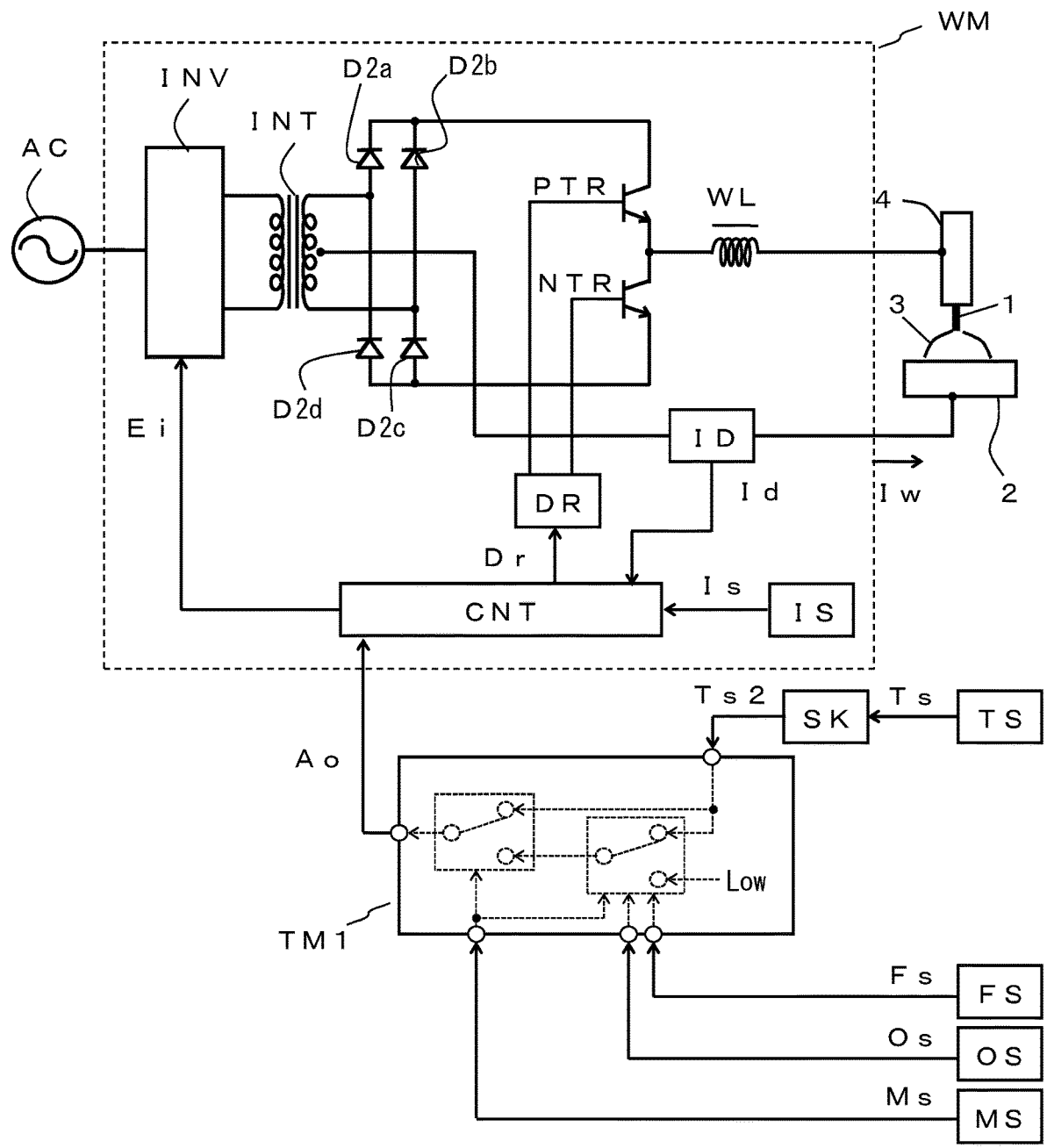
FIG. 6 is a block diagram of a welding machine for implementing a non-consumable electrode arc-welding method according to a fourth embodiment.

FIG. 6 is a block diagram of a welding machine that implements the non-consumable electrode arc-welding method according to the fourth embodiment. In FIG. 6, the same reference signs are given to blocks that are the same as FIG. 1, and description thereof is omitted. In FIG. 6, a self-holding circuit SK is inserted between the start signal setting circuit TS and the first welding output setting circuit TM1 of FIG. 1, so that the start signal (trigger signal) Ts, which is one of the input signals of the first welding output setting circuit TM1, produces (or is converted into) a second start signal Ts2. As seen from FIG. 7, the second start signal Ts2 of the fourth embodiment corresponds to the start signal Ts of the first to the third embodiments.

The self-holding circuit SK outputs the second start signal Ts2, with the start signal Ts as an input. The second start signal Ts2 indicates the state of being outputted and the state of not being outputted. The self-holding circuit SK only switches the state of the second start signal Ts2 when the start signal Ts changes from a non-input to an input (in other words, when a pulse signal is inputted).

Figure 7:
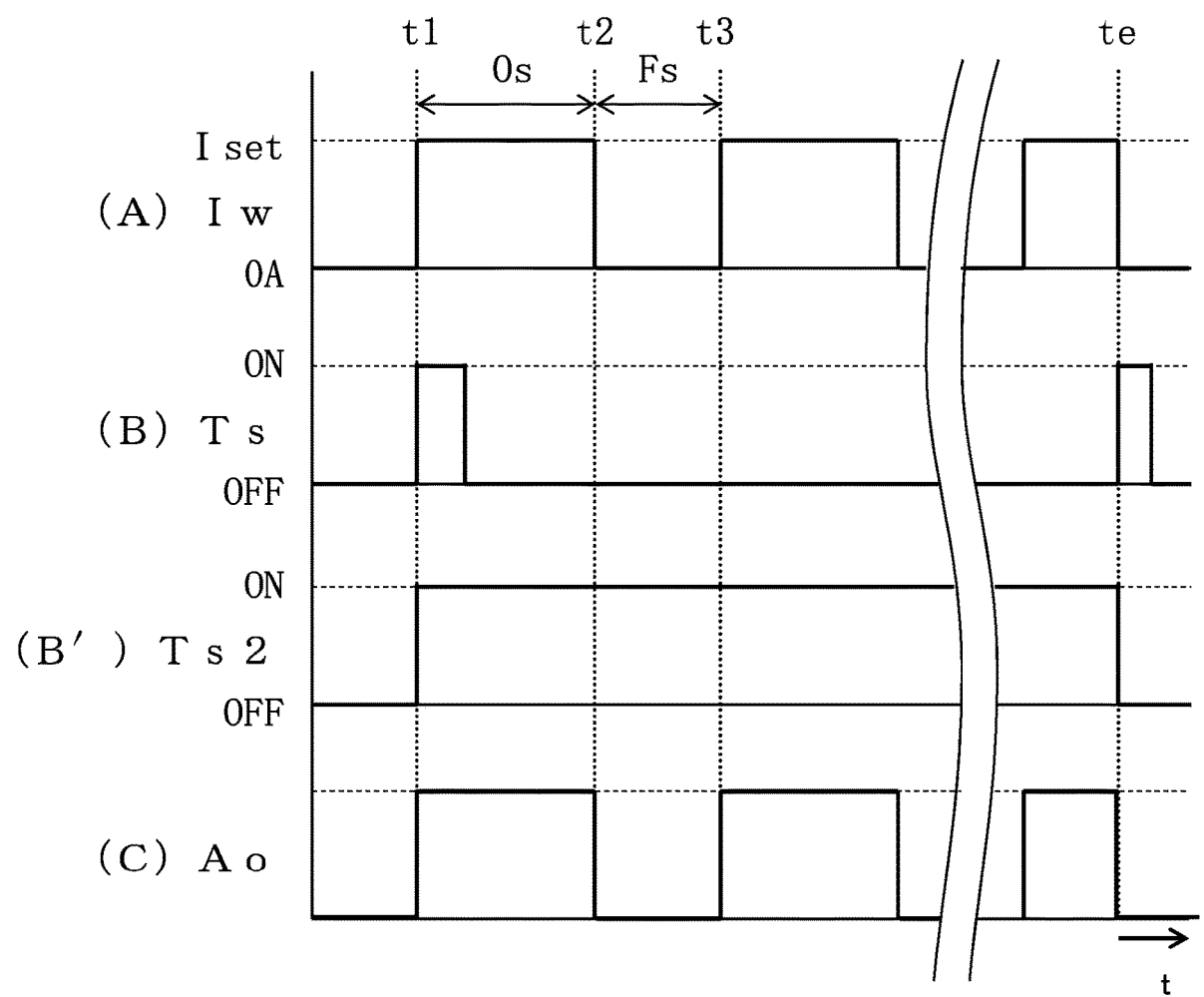
FIG. 7 is a timing chart of the non-consumable electrode arc-welding method in the fourth embodiment.

FIG. 7 is a timing chart of the non-consumable electrode arc-welding method in the fourth embodiment. (A) of FIG. 7 shows the change in the welding current Iw over time, (B) of FIG. 7 shows the change in the start signal (trigger signal) Ts over time, (B') of FIG. 7 shows the change in the second start signal Ts2 over time, and (C) of FIG. 7 shows the change in the welding output signal Ao over time. The horizontal axes each show time. Hereinafter, operations of the fourth embodiment will be described using FIG. 7. In FIG. 7, the same reference signs are given to signals and times that are the same as FIG. 2, and description thereof is omitted.

In (B') of FIG. 7, the second start signal Ts2 indicates the two states of OFF indicating the state of not being outputted and ON indicating the state of being outputted. When viewed from the side that receives the signal, OFF indicates not input and ON indicates input.

At time t1, the start signal Ts changed from OFF to ON, and thus the second start signal Ts2 changes from OFF to ON. Therefore, the first welding output setting circuit TM1 performs similar operations to the first embodiment, and the welding current Iw is outputted.

The start signal Ts changes from ON to OFF at a time after time t1. However, the second start signal Ts2 remains ON and unchanged. Accordingly, the first welding output setting circuit TM1 continues similar operations to the first embodiment.

At time te, the start signal Ts changed from OFF to ON, and thus the second start signal Ts2 changes from ON at OFF. Therefore, the first welding output setting circuit TM1 performs similar operations to the first embodiment, and stops output of the welding current.

The fourth embodiment is a mode in which the state of the start signal Ts of the first embodiment is self-held, and the welding current output period and the welding current interval period can be repeated even when the start signal Ts of the first embodiment is not inputted. In manual welding, continuously pushing a torch switch, which is a component corresponding to the start signal setting circuit, during welding is troublesome for the operator and leads to a decrease in workability. Accordingly, the fourth embodiment improves workability in manual welding over the first embodiment.

Also, the fourth embodiment can be implemented by replacing the start signal periphery, and can thus be implemented in combination with the second embodiment and the third embodiment.

The invention claimed is:

1. A non-consumable electrode arc-welding method for causing a welding machine to output or stop a welding current for a single welding torch, the method comprising:
    switching between an ON state and an OFF state of a start signal that controls an on/off operation of the welding machine; and
    switching between a normal mode and an interval mode of an operation mode instruction signal controlling an operation mode of the welding machine, wherein in the normal mode the welding current continues to be outputted when the start signal is in the ON state and the output of the welding current is suspended when the start signal is in the OFF state,
    wherein when the operation mode instruction signal indicates the interval mode and the start signal is in the ON state, the welding current is outputted in a predetermined welding current output period and the output of the welding current is suspended and becomes zero in a welding current interval period even though the start signal is in the ON state, the welding current interval period successively following the predetermined welding current output period.

2. The method according to claim 1, wherein the output and the suspension of the welding current are repeated while the start signal is in the ON state.

3. The method according to claim 1, wherein the welding current output period and the welding current interval period have predetermined lengths of time, respectively.

4. The method according to claim 2, further comprising:
    counting a number of times that the output and the suspension of the welding current are repeated; and
    stopping the output of the welding current when the counted number reaches a predetermined welding current output count.

5. The method according to claim 1, further comprising stopping the output of the welding current when a predetermined operation period elapses after the start signal is input.

6. The method according to claim 1, further comprising outputting a trigger signal that causes the start signal to switch between the ON state and the OFF state.

7. The method according to claim 1, further comprising switching the start signal from the OFF state to the ON state upon input of a first trigger signal, and switching the start signal from the ON state to the OFF state upon input of a second trigger signal.

* * * * *